(12) United States Patent
Takasu (10) Patent No.: US 9,145,066 B2
(45) Date of Patent: Sep. 29, 2015

(54) FUEL CELL VEHICLE

(71) Applicant: DENSO CORPORATION, Kariya, Aichi-pref. (JP)

(72) Inventor: Masashige Takasu, Owariasahi (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/277,876

(22) Filed: May 15, 2014

(65) Prior Publication Data

US 2015/0075885 A1 Mar. 19, 2015

(30) Foreign Application Priority Data

Jun. 11, 2013 (JP) .................................. 2013-122914

(51) Int. Cl.

| | |
|---|---|
| *B60L 11/18* | (2006.01) |
| *H01M 16/00* | (2006.01) |
| *H01M 8/04* | (2006.01) |
| *B60W 10/30* | (2006.01) |
| *B60T 13/26* | (2006.01) |
| *B60W 30/18* | (2012.01) |
| *B60W 10/184* | (2012.01) |
| *H01M 8/10* | (2006.01) |

(52) U.S. Cl.
CPC ....... *B60L 11/1883* (2013.01); *H01M 8/04597* (2013.01); *H01M 8/04753* (2013.01); *H01M 16/006* (2013.01); *B60T 13/26* (2013.01); *B60T 13/268* (2013.01); *B60W 10/184* (2013.01); *B60W 10/30* (2013.01); *B60W 30/18* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2009/0207049 A1* | 8/2009 | Liao | 340/988 |
| 2010/0248051 A1* | 9/2010 | Shimoda et al. | 429/428 |
| 2013/0304329 A1* | 11/2013 | Feyerabend et al. | 701/48 |

FOREIGN PATENT DOCUMENTS

| | | |
|---|---|---|
| JP | 2004-192826 A | 7/2004 |
| JP | 2005-293868 A | 10/2005 |
| JP | 2007-220323 A | 8/2007 |
| JP | 2009-165242 A | 7/2009 |
| JP | 2013-099081 A | 5/2013 |

OTHER PUBLICATIONS

Office Action mailed May 26, 2015 in the corresponding JP application No. 2013-122914 (and English translation).

* cited by examiner

*Primary Examiner* — John Walters
*Assistant Examiner* — Hilary L Johns
(74) *Attorney, Agent, or Firm* — Posz Law Group, PLC (57) ABSTRACT

A fuel cell vehicle including a fuel cell, a traveling motor, a secondary battery, a predetermined device, an air tank, an electric air feeder, and a control unit is provided. The fuel cell is mounted to a vehicle, and at least has a pair of electrodes that pinch an electrolyte membrane, the pair of electrodes including a catalyst. The traveling motor is driven by a generated power of the fuel cell to provide a driving force to a driving wheel. The secondary battery is charged with the generated power. The predetermined device is driven by an air pressure and has a predetermined function of the vehicle. The air tank stores a compressed air for driving the predetermined device. The control unit controls (i) a charge of the secondary battery, (ii) an operation of the air feeder, (iii) an power generation and (iv) a feeding destination.

9 Claims, 6 Drawing Sheets

FUEL CELL VEHICLE

CROSS REFERENCE TO RELATED APPLICATION

This application is based on Japanese Patent Application No. 2013-122914 filed on Jun. 11, 2013, the disclosure of which is incorporated herein by reference.

TECHNICAL FIELD

The present disclosure relates to a fuel cell vehicle that travels using a generation power of a fuel cell.

BACKGROUND OF THE INVENTION

Patent document 1: JP-A-2007-220323

Dissolution and elution of a catalyst component (e.g. Pt, Rh, Pd, or the like) in an electrode catalyst in a fuel cell have been studied conventionally. Many research findings reported about a mechanism of the dissolution and the elution. According to a certain report, since a platinum oxide dissolves in a solution, it is supposed that platinum may dissolve via the platinum oxide. As an electric potential in the solution becomes high, the amount of the elution of platinum may become large, and the platinum oxide formation may be promoted. When cell voltage (corresponding to an electric potential in a fuel cell) becomes high, platinum or the like in an electrode catalyst layer in the catalyst component may be easily eluted. The elution of platinum or the like may cause degradation and a performance deterioration of the fuel cell.

Electrical voltage generated by a fuel cell changes according to an output of the fuel cell. When the output of the fuel cell becomes high, the voltage of the fuel cell will decrease. When the output of the fuel cell becomes low, the voltage of the fuel cell will increase. In this case, accompanying with a change of voltage, platinum or the like in, especially, a cathode catalytic layer of an oxidant electrode may be eluted, and a performance deterioration of the fuel cell may be caused.

For example, in patent document 1, in order to prevent degradation and a performance deterioration of the fuel cell, when a state of charge (SOC) of a secondary battery is higher than 10%, an output control portion restricts the output of the fuel cell. In addition, the voltage of the fuel cell may not be lower than a predetermined voltage. Accordingly, an electrical potential of the oxidant electrode in the fuel cell is kept high, a variation of the electrical potential of the oxidant electrode is kept low. An oxide layer in a platinum surface of the cathode catalytic layer of the oxidant electrode may not be reduced and may not elute. In addition, it may be possible to prevent the platinum from eluting when a brake pedal of a vehicle is stepped on, the output of the fuel cell becomes low, and the electrical voltage of the fuel cell becomes high.

The inventor of the present invention has found the following with respect to a fuel cell. In patent document 1, when a state of charge of the secondary battery is high, it is required that an auxiliary machine consumes a generated power of the fuel cell or the output of the fuel cell should be reduced. However, in this case, deterioration of fuel efficiency, degradation or a performance deterioration of the fuel cell may occur.

SUMMARY

It is an object of the present disclosure to provide a fuel cell vehicle, which prevents a degradation of a fuel cell, and improves fuel efficiency by preventing elution of a catalyst component occurring in a polymer electrolyte fuel cell.

According to one example of the present disclosure, a fuel cell vehicle including a fuel cell, a traveling motor, a secondary battery, a predetermined device, an air tank, an electric air feeder, and a control unit is provided. The fuel cell is mounted to a vehicle, and at least has a pair of electrodes that pinch an electrolyte membrane, the pair of electrodes including a catalyst. The traveling motor is driven by a generated power of the fuel cell to provide a driving force to a driving wheel of the vehicle. The secondary battery is charged with the generated power of the fuel cell. The predetermined device is driven by an air pressure and has a predetermined function of the vehicle. The air tank stores a compressed air for driving the predetermined device. The electric air feeder supplies air to the air tank. The control unit controls (i) a charge of the secondary battery, (ii) an operation of the air feeder, (iii) a power generation of the fuel cell and (iv) a feeding destination of the generated power of the fuel cell. The control unit operates the air feeder using the generated power of the fuel cell, supplies the air to the air tank, and converts the generated power into the air pressure of the air tank when a state of charge of the secondary battery is equal to or more than a predetermined value.

According to the above fuel cell vehicle, when a state of charge of the secondary battery is equal to or more than a predetermined value, it is determined that an availability in the secondary battery to charge the generated power of the fuel cell is not enough. The air feeder is operated, so that air is supplied to the air tank. Accordingly, the generated power of the fuel cell, for example, the surplus power is converted into air pressure in the air tank. When cell voltage in the fuel cell becomes high, platinum or the like in an electrode catalyst layer may be easily eluted, and when the output of the fuel cell becomes high, the voltage may reduce. According to this control, it is possible to reduce the voltage of the fuel cell and in addition, and it is possible to effectively utilize the increased output power as the air pressure. Therefore, it is possible to provide the fuel cell vehicle, which prevents a degradation of a fuel cell, and improves fuel efficiency by preventing elution of a catalyst component occurring in a polymer electrolyte fuel cell.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with referring to the drawings. In each embodiment, a component in one embodiment corresponding to a component explained by a preceded embodiment is given by the identical reference symbols, and a description for the component may be omitted. When a configuration is explained in one embodiment partially, a description of a preceded embodiment may apply to the configuration in the one embodiment other than the explained part in the one embodiment. It should be noted that, not only combinations of components, which are specifically mentioned that a combination is possible in each embodiment, but all or a part of each embodiment may be combined even if the combination is not specified, unless any difficulties does occur about a combination.

First Embodiment

Figure 1:
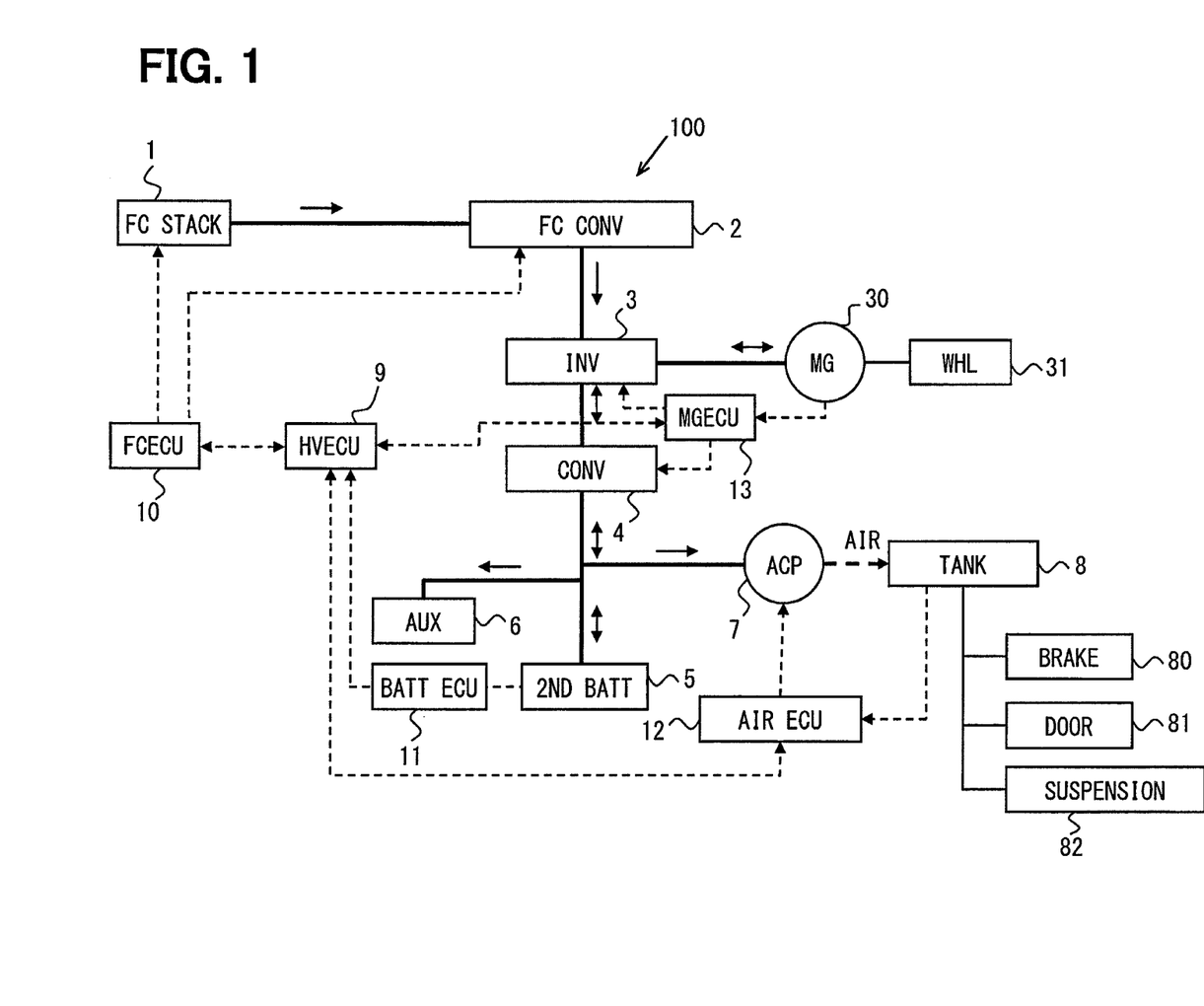
FIG. 1 is a schematic diagram illustrating a mechanism of an energy conversion in a fuel cell vehicle in the first embodiment.

The first embodiment according to the present disclosure will be explained with referring to FIG. 1 to FIG. 3. FIG. 1 illustrates a flow of an energy conversion in a fuel cell vehicle 100. The energy conversion (i) stores a generation power of a fuel cell to a secondary battery 5, (ii) generates a vehicle driving force through a traveling motor (also referred to as a motor generator) 30, and (iii) converts the generation power of the fuel cell into an air energy for operating a predetermined device. Incidentally, a bold solid line represents a high voltage line, and an arrow represents a flow of the electric power. A dashed line represents a control signal.

A fuel cell vehicle (hereinafter referred to as FCV for simplicity) 100 of the first embodiment will be explained. The fuel cell vehicle 100 includes a fuel cell, a traveling motor 30, the secondary battery 5, an air tank 8, an electric compressor 7, and the electronic controller (hereinafter, referred to as ECU for short) that controls an operation of each part at least. The fuel cell corresponds to a FC stack 1 in the present embodiment.

The fuel cell is a polymer electrolyte fuel cell including the FC stack 1. Multiple cells in the FC stack 1 are layered. Each of the multiple cells includes a membrane and electrode structure, and a pair of separators pinching the membrane and electrode structure, for example. The membrane and electrode structure includes an electrolyte membrane, which is an ion exchange membrane of a solid polymer, and a pair of electrodes, which sandwich the electrolyte membrane from the both surfaces of the electrolyte membrane. The ion exchange membrane serves as an electrolyte so that a hydrogen ion generated in an anode (corresponding to a fuel electrode) moves to a cathode (corresponding to an oxygen electrode).

The pair of separators has a fluid passage for supplying an oxidizing gas (e.g. air) and a fuel gas (e.g. a hydrogen gas) to each of the electrodes. The pair of separators prevents the different kinds of fluids, which are supplied to adjacent cells from mixing. According to this configuration, an electrochemical reaction occurs in the membrane and electrode structure in each cell and an electromotive force is generated.

The fuel cell vehicle 100 includes a hydrogen tank, a pump, an air compressor, and a FCECU 10. The hydrogen tank includes hydrogen supplied to the anode of the fuel cell. The pump is an electric pump, and is provided in a hydrogen supply route connecting the hydrogen tank and the anode. The pump forcibly supplies the hydrogen in the hydrogen tank to the anode. The air compressor is an electric compressor forcibly supplying the air to the cathode of the fuel cell. The FCECU 10 controls each supplied amount of the air and the hydrogen to the FC stack 1. The FCECU 10 controls an output power of the FC stack 1 according to a target output power of the FC stack 1.

A FC boost converter (referred to as a FC converter) 2 performs a boost or the like of the output from the cell stack (corresponding to the FC stack 1) of the fuel cell. The FC converter 2 controls the output terminal voltage of the FC stack 1. The FC converter 2 performs a boost conversion converting the FC output terminal voltage inputted from the FC stack 1 to a boosted voltage different from the voltage of the FC output terminal voltage, and outputs the boosted voltage to an inverter 3. The FC converter 2 controls the output terminal voltage so that the output terminal voltage of the FC stack 1 has a voltage of a target output power of the FC stack 1.

The FC converter 2 includes a circuit configuration and performs as a boost converter of a three-phase operation type or a four-phase operation type, for example. Each phase of the FC converter 2 includes a reactor, a diode for commutation, and a switching element. The switching element includes, for example, an insulated gate bipolar transistor (IGBT), or the like. A current sensor detecting a reactor current of each phase detects a current flowing in the reactor. For example, the FCECU 10 actualizes the target output voltage of the FC stack 1 by controlling a duty ratio of ON/OFF of the switching element.

The traveling motor 30 provides the driving wheel 31 of the fuel cell vehicle 100 with driving force. The traveling motor 30 is driven using the generation power of the fuel cell. The secondary battery 5 is charged by the generation power of the fuel cell. In addition, the secondary battery 5 is a feeder system, and the secondary battery 5 discharges power used by the auxiliary machine 6 of a vehicle, the compressor 7, the traveling motor 30, or the like.

The HVECU 9 is one of control computers of the fuel cell vehicle 100, and a control device including a CPU, a RAM, a ROM, or the like. The HVECU 9 performs a predetermined operation using a signal inputted from sensors and calculates a power required for a vehicle traveling, a power required for actualizing a predetermined vehicle function, and a power required for actuation of the auxiliary machine. For example, the HVECU 9 transmits the target output power of the FC stack 1 to the FCECU 10.

A battery ECU 11 monitors a condition of the secondary battery 5. The battery ECU 11 outputs data of an amount of discharge and charge to the HVECU 9. The data are inputted from the secondary battery 5. The air supply ECU 12 controls operation of the compressor 7. The air supply ECU 12 obtains a data of the amount of compressed air in the air tank 8. The air supply ECU 12 outputs a data of the amount of the power required for operating the compressor 7, and a data of the amount of the compressed air in the air tank 8 to the HVECU 9. Each of the ECUs 9-12 controls a charge of the secondary battery 5, or the operation of the compressor 7. Furthermore, each of the ECUs 9-12 controls a power generation by the fuel cell, or a feed destination of the generation power of the fuel cell.

The fuel cell vehicle 100 includes a device driven with air pressure. The device corresponds to a predetermined device to exhibit a predetermined function included in the vehicle. The predetermined device is a brake device 80, a door operator 81, and a suspension device 82, for example. The device is supplied with air stored in the air tank 8. That is, the air tank 8 stores the compressed air, which is required so that the brake device 80, the door operator 81, and the suspension device 82, or the like are driven. The compressor 7 is an electric air feeder supplying air to the air tank 8.

The brake device 80 is an example of an air brake device in the present disclosure. The brake device 80 brakes a wheel using the compressed air stored to the air tank 8. For example, when a full air brake is used, and an occupant (e.g. a driver or an operator) steps on a brake, the compressed air of the air tank 8 is supplied to a brake chamber through a relay valve controlled by a predetermined ECU. The brake chamber operates a brake directly. Accordingly, a rod of the chamber is extended to perform a brake. The brake device 80 may be, in addition to the full air brake, an air over hydraulic brake, in which a hydraulic brake and an air brake are combined.

The door operator 81 is an air operating door opening and shutting device and the compressed air stored in the air tank 8 serves as a driving force, which opens and closes a door of the vehicle. When a door opening and shutting instruction is sent to the door operator 81 by an operation of an occupant, the compressed air of the air tank 8 is supplied to an air cylinder of the door operator 81 through a relay valve controlled by a predetermined ECU, the air cylinder operates so that the door opens and closes.

The suspension device 82 is an air operating suspension device. The suspension device 82 adjusts a comfortability of a ride or adjusts a vehicle height using elasticity of air by the compressed air stored in the air tank 8. When the fuel cell vehicle 100 is a bus, the suspension device 82 is operated so that the vehicle height at a bus doorway side may be dropped down by a kneeling function, and it is possible that an occupant easily gets on and off the bus. In this case, by temporarily remove air of the chamber in the suspension device 82 at the bus doorway side, it is possible to reduce the vehicle height at the doorway side. Furthermore, based on an operation of an occupant (e.g. a driver) or a vehicle height automatic control system, when an instruction of vehicle height adjustment is transmitted, the chamber of the suspension device 82 is supplied with the compressed air of the air tank 8 through the relay valve controlled by a predetermined ECU. Accordingly, when the vehicle height is reduced too much due to a heavy load, it is possible to adjust the vehicle height properly.

As described above, the predetermined ECUs control to switch the relay valve, and the compressed air in the air tank 8 stored by the compressor 7 is supplied to the brake device 80, the door operator 81, the suspension device 82, or the like.

The fuel cell vehicle 100 includes a DC/DC converter 4 (hereinafter, also referred to as a converter 4) between the secondary battery 5 and the inverter 3.

A supply destination of the power stored in the secondary battery 5 is the traveling motor 30, the compressor 7, the auxiliary machine 6 of the vehicle, or the like. The auxiliary machine 6 is a power consumption apparatus, which is other than the traveling motor 30 and the compressor 7, mounted to the vehicle. The auxiliary machine 6 includes, for example, a gearhead, various control devices, a steering gear, a suspension system, an air-conditioner, a lighting device, an audio, a navigation device, or the like.

The secondary battery 5 functions as a storage source of a surplus electric power by the generation power of the fuel cell, a regeneration energy storage source in a regenerative braking, a buffer storing energy or the like in a load fluctuation accompanying an acceleration or deceleration of the vehicle. The secondary battery 5 is, for example, a nickel-cadmium (Ni—Cd) storage battery, a nickel hydrogen storage battery, a lithium ion battery, or the like.

The converter 4 controls an input voltage of the inverter 3. The converter 4 has a circuit configuration similar with the FC converter 2, for example, and the converter 4 is controlled by the MGECU 13. The inverter 3 may be a PWM inverter driven in a pulse width modulation, for example. The inverter 3 converts a direct current power outputted from the FC stack 1 or the secondary battery 5, according to a control instruction from the MGECU 13, into the three-phase AC power, and controls a rotary torque of the traveling motor 30. In addition, it is possible that the traveling motor 30, the inverter 3, and the converter 4 collect a part of a kinetic energy as electrical energy when the fuel cell vehicle 100 slows down and stops during traveling, and charge the secondary battery 5.

The traveling motor 30 generates the regenerative power at the time of deceleration. The fuel cell vehicle 100 includes a reduction gear. The reduction gear slows down a rotation speed of the traveling motor 30 to a predetermined rotational speed, and rotates a shaft corresponding to a shaft part of the driving wheel 31. The MGECU 13 receives information representing operation conditions, such as a current value and a rotation angle, or the like about the traveling motor 30. The MGECU 13 transmits information of an output torque of the traveling motor 30 to the HVECU 9.

The HVECU 9 determines allocation of the output power of each of the fuel cell and the secondary battery 5, and operates an instruction value of the output power. When the HVECU 9 determines the output allocation (corresponding to a required power) required for the fuel cell and the secondary battery 5, the HVECU 9 transmits the information to the FCECU 10 and the MGECU 13. The FCECU 10 and the MGECU 13 control operation of the FC converter 2 and the converter 4, so that power equivalent to each of the required powers is obtained. In addition, so that a target torque responding to an accelerator opening is obtained, the MGECU 13 outputs an instruction value of AC voltage of each phase to the inverter 3 as a switching instruction, and controls an output torque and a rotational speed of the traveling motor 30.

In addition, when the output power of the fuel cell is larger than the power demanded by the vehicle, and a predetermined condition is satisfied, the HVECU 9 controls the secondary battery 5 to charge surplus electric power. When the generation power of the fuel cell is surplus, and the secondary battery 5 cannot be charged, the HVECU 9 operates the compressor 7 using the generation power of the fuel cell, and supplies the air to the air tank 8 through the air supply ECU 12. Accordingly, the compressed air is stored in the air tank 8, and the generation power of the fuel cell is converted into an air pressure in the air tank 8. Therefore, the electrical energy generated in the fuel cell is converted into the pressure energy when the electrical energy is not stored as the electrical energy, and the pressure energy is effectively used for a vehicle function.

As described above, the HVECU 9 determines that the generation power of the fuel cell is supplied to the traveling motor 30, the compressor 7, and the secondary battery 5, or the HVECU 9 determines how the generated power is allocated. In addition, the HVECU 9 determines that the stored power of the secondary battery 5 is supplied to the traveling motor 30, the compressor 7, the auxiliary machine 6, or the like, or the HVECU 9 determines how the stored power is allocated.

Figure 2:
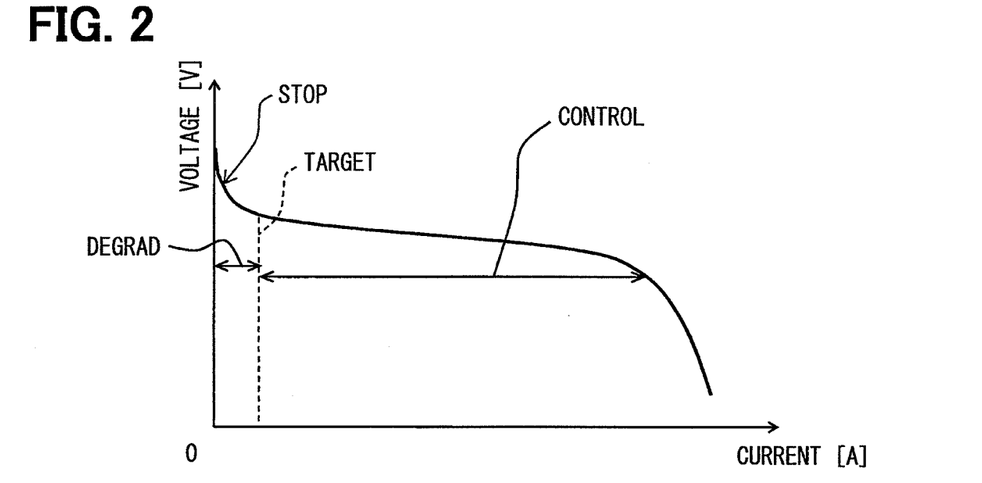
FIG. 2 is a drawing illustrating a graph explaining a property and a control concept of a fuel cell mounting to the fuel cell vehicle.

The fuel cell has a property illustrated in FIG. 2, and the HVECU 9 performs a control according to a control concept in FIG. 2 with various ECUs or as a main ECU. That is, a platinum or the like of an electrode catalyst in the FC stack 1 may easily elute when the cell voltage is high potential (corresponding to a degradation area), and this elusion may cause degradation and a performance deterioration of the fuel cell.

Therefore, when the cell voltage is high at the time of stop of the vehicle, a degradation of the fuel cell may progress. In addition, voltage of the fuel cell changes according to output of the fuel cell, and the voltage of the fuel cell reduces as the output increases. Therefore, the HVECU 9 controls the generation power of the fuel cell so that the cell voltage is lower than a predetermined voltage corresponding to a lower limit target (referring to a control area in FIG. 2). That is, the HVECU 9 keeps the cell voltage of the fuel cell below a voltage corresponding to the lower limit target in FIG. 2, and the HVECU 9 controls the power generation of the fuel cell to be in an area where the cell voltage is not too much high.

On the contrary, when the fuel cell is controlled in an area (or a condition) to keep the cell voltage, the output of the fuel cell becomes large and, in certain cases, the surplus electric power may be generated compared with the power requirement of the vehicle. When the surplus electric power becomes large, the energy may not be utilized effectively, and fuel consumption may become worse as a whole. Therefore, the HVECU 9 with various ECUs or HVECU 9 as a main ECU converts the surplus energy of the generation power of the fuel cell into the air energy, and the HVECU 9 performs a characteristic control utilized for actualization of a predetermined function in the vehicle.

A control of an energy conversion in the fuel cell vehicle 100 will be explained referring to a flow chart of FIG. 3. Various ECUs or mainly the HVECU 9 execute each processing in the control.

When a vehicle start switch such as an ignition switch or the like is turned on, various ECUs or the HVECU 9 compare the generated power of the FC stack 1 with the power (hereinafter, referring to as a vehicle requirement power) required in the vehicle at present. Various ECUs or the HVECU 9 determine whether the generated power of the FC stack 1 has a surplus. For example, when the generated power is larger than the vehicle requirement power by a predetermined electric energy, various ECUs or the HVECU 9 may determine that the generated power has a surplus (S10). This step is repeatedly performed until it is determined that the generated power has a surplus.

When it is determined that the generated power has the surplus at step 10, the processing proceeds to step 20. At step 20, it is determined whether the compressed air stored in the air tank 8 is less than a predetermined air amount. When it is determined that the compressed air in the air tank 8 is equal to or more than the predetermined air amount at step 20, this situation represents that the air tank 8 stores the compressed air that the brake device 80 or the like can perform the predetermined function. Therefore, it is unnecessary to convert the surplus of the generation power of the fuel cell into the air energy, "a usual feed control" is executed at step 30, the processing returns to step 10, so that each subsequent processing is repeatedly performed. In the usual feed control, when the power is required for the vehicle traveling or the power is required for an air conditioning, an illumination, a display device, or the like, the HVECU 9 calculates the power that should be supplied to the traveling motor 30, the auxiliary machine 6, or the like. The HVECU 9 supplies the calculated electric power from the surplus of the generated power and the stored electric power of the secondary battery 5.

When it is determines that the compressed air of the air tank 8 is less than the predetermined air amount at step 20, the processing proceeds to step 40. It is determined whether a charge condition of the secondary battery 5 is satisfied at step 40. For example, when a state of charge (SOC), which is a charge rate, of the secondary battery 5 is less than a predetermined value, it is determined that the charge condition of the secondary battery 5 is satisfied. In that case, the secondary battery 5 has enough availability to charge, and is in a condition where the secondary battery 5 can be charged.

When it is determined that the charge condition of the secondary battery 5 is satisfied at step 40, the HVECU 9 and various ECUs control each part to perform charging to the secondary battery 5 at step 50, and the secondary battery 5 stores the surplus electric power into a free space of the secondary battery 5. The processing returns to step 10, and each subsequent processing is repeatedly executed.

When it is determined that the charge condition of the secondary battery 5 is not satisfied at step 40, the processing proceeds to step 60. At step 60, an air pressure storing processing executes and supplies the air tank 8 with the compressed air. The processing returns to step 10, and each subsequent processing is repeatedly executed. The air supply ECU 12 operates the electric compressor 7 using a surplus power of the generation power of the fuel cell, and stores the compressed air in the air tank 8. Accordingly, it is possible to convert the generation power of the fuel cell into the air pressure in the air tank 8. The air energy, which is converted from the generated power, is effectively utilized when the brake device 80, the door operator 81, the suspension device 82, or the like, which perform the predetermined function using air pressure are operated in the vehicle.

Technical effects according to the fuel cell vehicle 100 in the first embodiment will be explained. According to the fuel cell vehicle 100, when the charge condition is not satisfied since the SOC of the secondary battery 5 is equal to or more than the predetermined value, the air supply ECU 12 operates the compressor 7 using the generation power of the fuel cell, and supplies the air tank 8 with air. The generated power is converted into the air pressure of the air tank 8.

Accordingly, when the SOC of the secondary battery 5 is equal to or more than the predetermined value, it is determined that an availability (or a free space to store the generation power) to charge the generation power of the fuel cell is not enough in the secondary battery 5. The air supply ECU 12 operates the compressor 7 to supply the air tank 8 with the air (step 60). According to this processing, the generation power of the fuel cell is converted into the air pressure of the air tank 8 and is stored.

A polymer electrolyte fuel cell has the following characteristic of the fuel cell. When cell voltage becomes high, platinum or the like in an electrode catalyst layer may be easily eluted, and when the output of the fuel cell becomes high, the voltage may reduce. Therefore, according to the mechanism of an energy conversion in the present embodiment, it is possible to reduce the voltage of the fuel cell and in addition, and it is possible to effectively utilize the increased output power as the air pressure. That is, in the fuel cell vehicle 100, which controls the elution of the catalyst component occurring in the polymer electrolyte fuel cell, controls a degradation of the fuel cell, and improves a fuel consumption, may be provided.

According to the mechanism of the energy conversion, it may be possible to reduce a dissolution or an elution of the catalyst components (e.g. Pt, Rh, Pd, or the like) that occurs at the cathode pole in the polymer electrolyte fuel cell, to reduce the degradation of the fuel cell, and to improve the fuel consumption.

In addition, immediately after the fuel cell starts, since a potential is changed largely, especially platinum of the cathode catalytic layer may be eluted. Due to the elution of the catalytic layer, the catalyst deteriorates and a power generation performance of the fuel cell decreases, so that a durability of the fuel cell may reduce. According to the energy conversion mechanism in the fuel cell vehicle 100, it may be possible to prevent the durability of the fuel cell from lowering. The lowering of the durability may be caused by a situation immediate after the fuel cell starts up.

Second Embodiment

Figure 3:
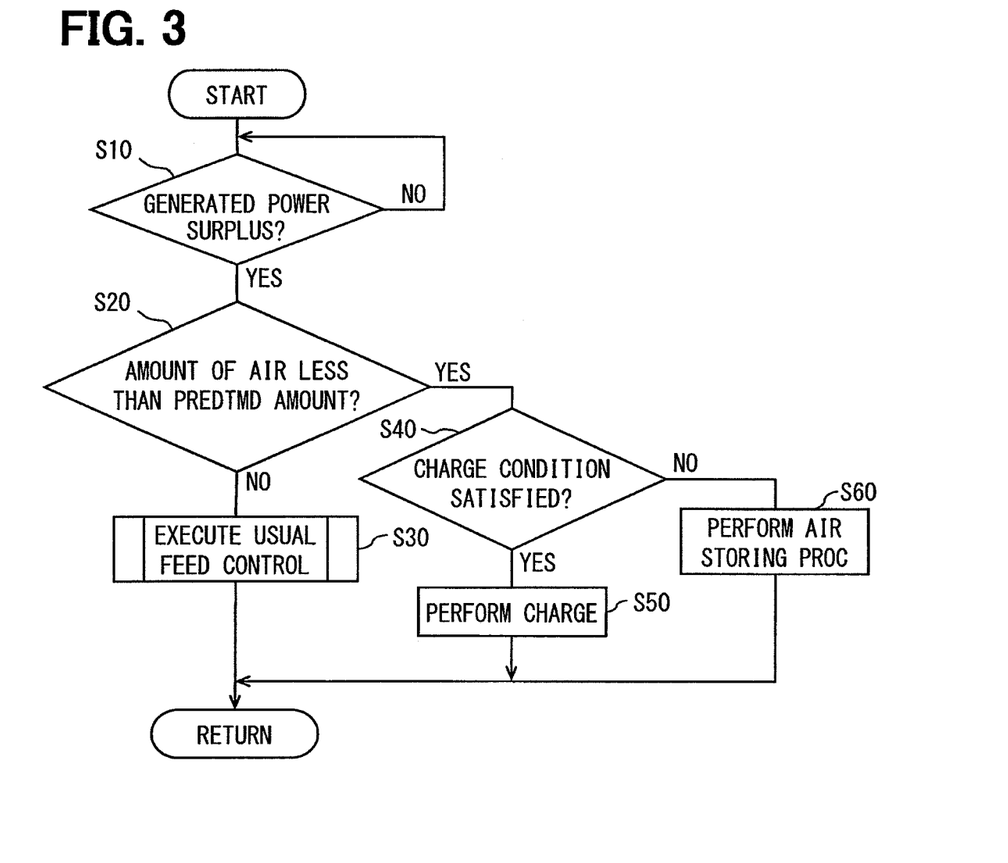
FIG. 3 is a flow chart illustrating a control of an energy conversion in the first embodiment.
Figure 4:
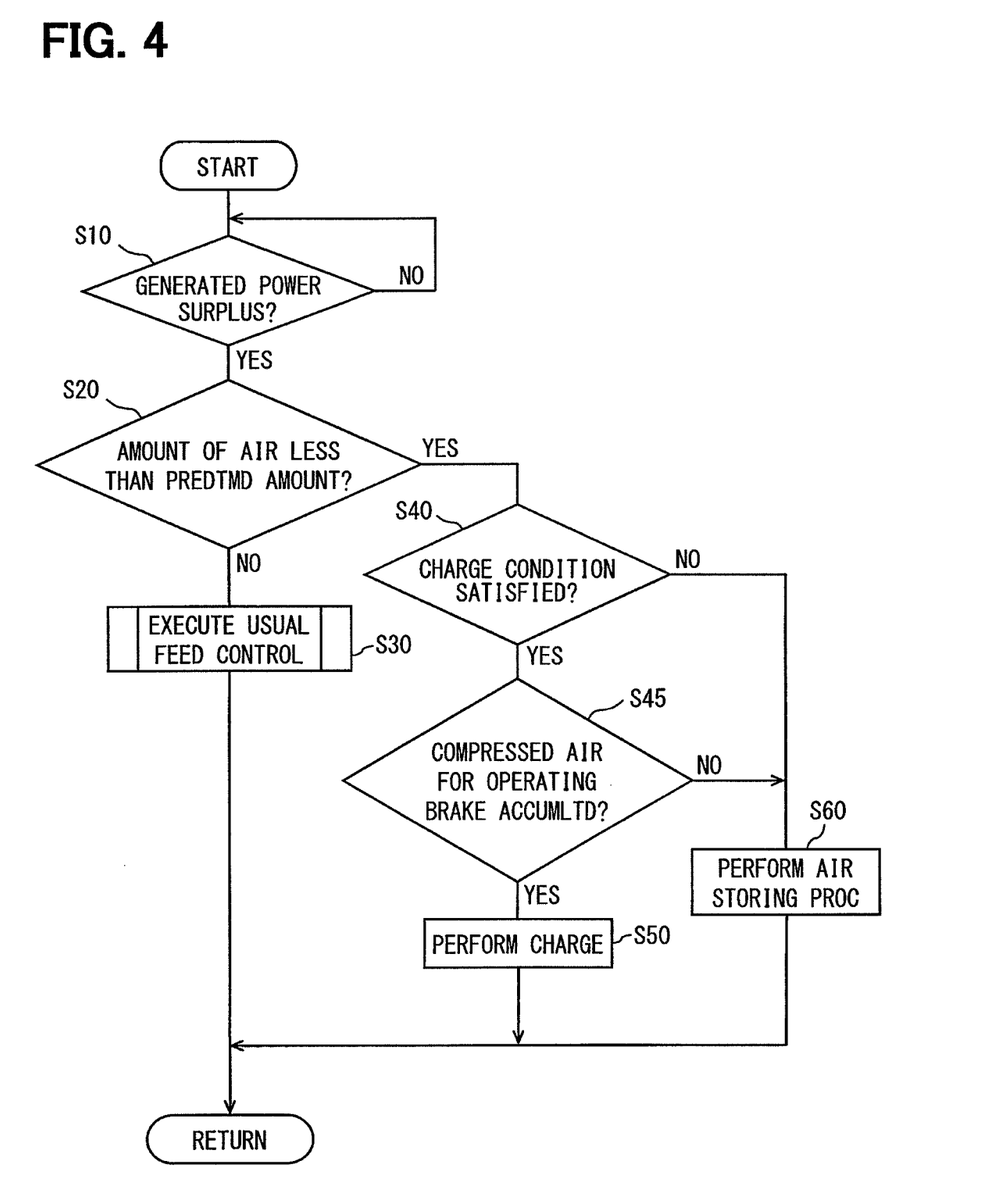
FIG. 4 is a flow chart illustrating a control of an energy conversion in a second embodiment.

The second embodiment is another embodiment of the control of the energy conversion explained as the first embodiment referring to FIG. 3. The control of the energy conversion in the second embodiment is illustrated as a flow chart in FIG. 4. A step having the identical symbol as FIG. 3 in FIG. 4 represents a step similar to the first embodiment, and a technical effect is also similar to the first embodiment. Hereinafter, a processing, a function and an effect, which are different from the first embodiment, will be explained in the second embodiment.

As described in FIG. 4, when it is determined that the charge condition of the secondary battery 5 is satisfied at step 40, the HVECU 9 determines whether the compressed air for driving the predetermined device such as the brake device 80 is accumulated in the air tank 8 at step 45 through the air supply ECU 12. When the HVECU 9 determines NO at step 45, even when the HVECU 9 determines that the charge condition of the secondary fuel 5 is satisfied at step 40 (corresponding to a condition that the secondary battery 5 is chargeable), the processing proceeds to step 60 to perform an air pressure storing processing. Therefore, according to the fuel cell vehicle 100 of the second embodiment, regardless of the SOC of the secondary battery 5, a control securing a required amount of the compressed air in the air tank 8 is provided.

According to the second embodiment, when the compressed air to operate the apparatus such as the brake device 80 or the like is not stored in the air tank 8, the compressor 7 is operated using the generated power regardless of an electric storing condition of the secondary battery 5. The air is supplied to the air tank 8 (step 45, and step 60).

According to the control, when the compressed air, which can operate the brake device 80, the door operator 81, and the suspension device 82 or the like, is not stored, the generated power of the fuel cell is converted into the air pressure of the air tank 8 regardless of the state of SOC of the secondary battery 5. Accordingly, it is possible that the compressed air is always secured, and that the fuel cell vehicle 100 always starts up the brake device 80, the door operator 81, and the suspension device 82, or the like.

Third Embodiment

Figure 5:
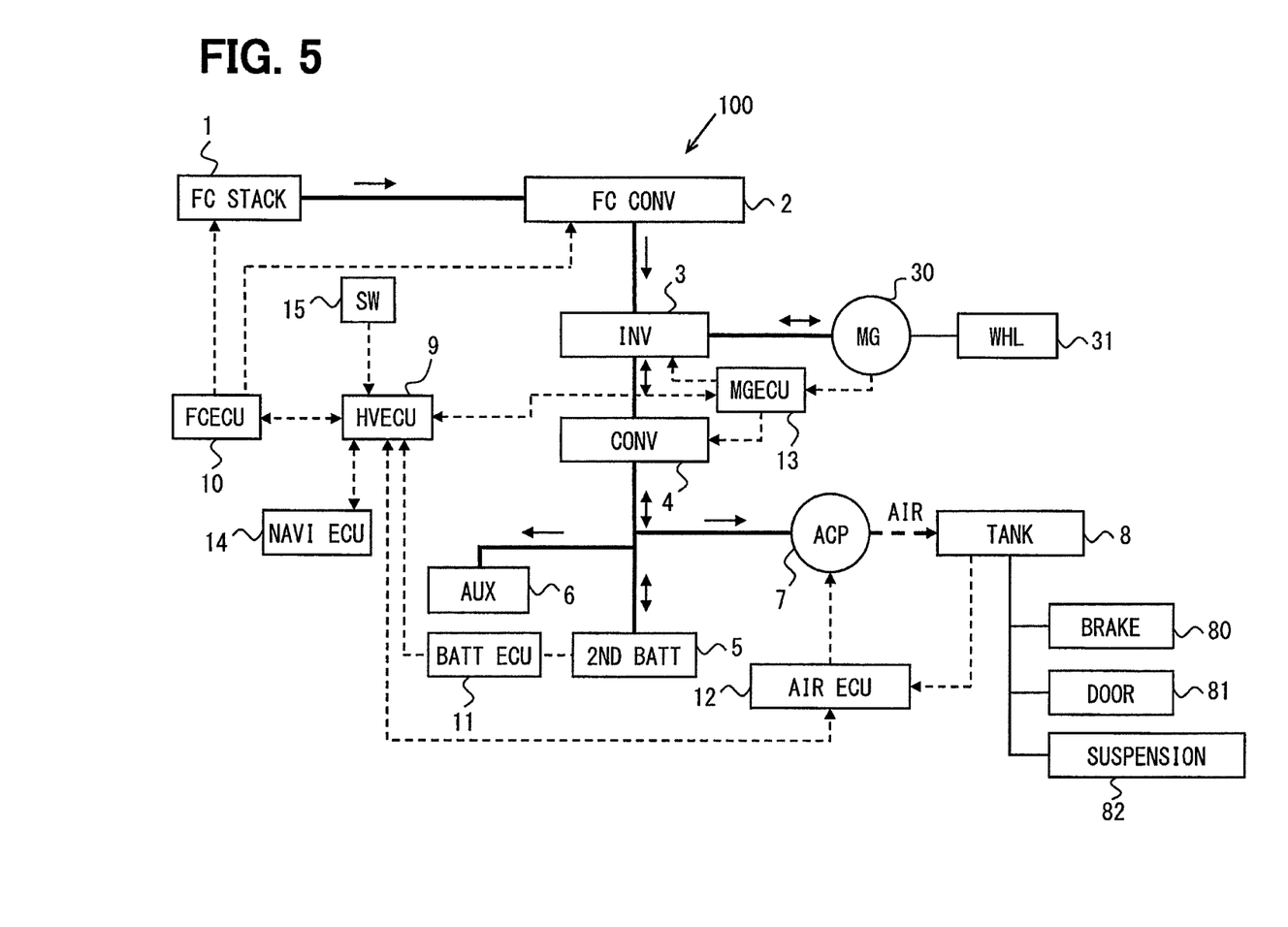
FIG. 5 is a schematic diagram illustrating the mechanism of the energy conversion in the fuel cell vehicle in a third embodiment and a fourth embodiment.
Figure 6:
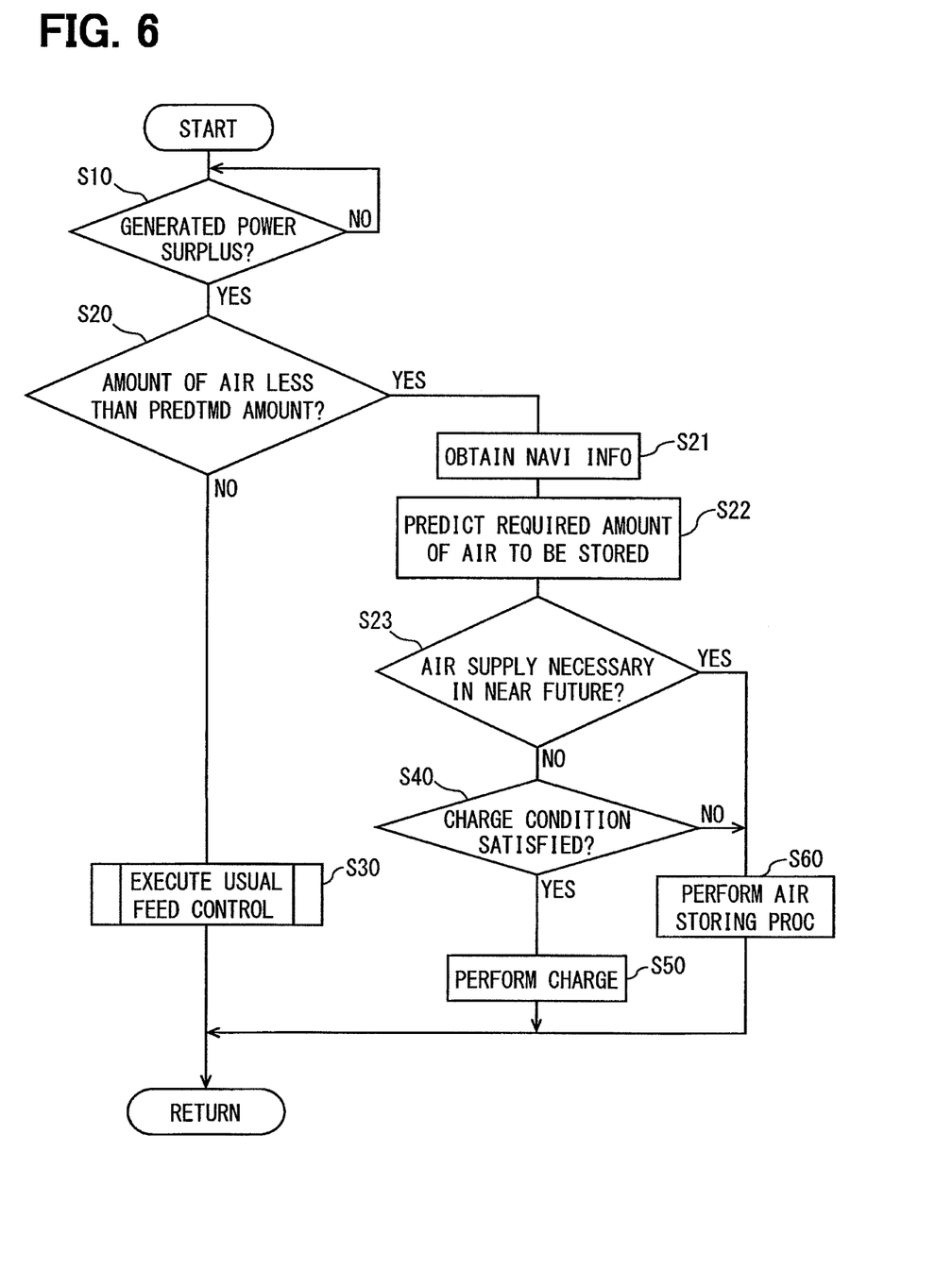
FIG. 6 is a flow chart illustrating the control of the energy conversion in the third embodiment.

The fuel cell vehicle 100A of the third embodiment is different from the fuel cell vehicle 100 of the first embodiment in that the fuel cell vehicle 100A predicts a required air amount of an air tank by an operation using vehicle positional information or the like. The fuel cell vehicle 100A of the third embodiment restricts air supply to the air tank 8 according to a predicted amount of the air. The vehicle positional information represents positional information of the fuel cell vehicle 100A. FIG. 5 illustrates a configuration of the fuel cell vehicle 100A. A flow chart illustrated in FIG. 6 illustrates a control of an energy conversion in the third embodiment. A component attached the identical symbols as FIG. 1 in FIG. 5 is a similar configuration of the first embodiment, and the effect of the component is similar to the effect of the first embodiment. In FIG. 5, a bold solid line represents a high voltage line, and an arrow represents a flow of the electric power. A dashed line represents a control relationship. A step having the identical symbols as FIG. 3 in FIG. 6 performs the similar step as the first embodiment. Hereinafter, in the third embodiment, a configuration, processing, operation, and effect different from the first embodiment will be explained.

As described in FIG. 6, when it is determined that the compressed air of the air tank 8 is less than a predetermined amount of air at step 20, vehicle positional information and traffic information will be obtained at step 21. A navigation device mounted in the vehicle provides the vehicle positional information and the traffic information. The navigation ECU 14 performs an information communication to the HVECU 9. For example, the navigation ECU 14 detects the vehicle positional information or the like by a GPS receiver or the like, and outputs the vehicle positional information or the like to the HVECU 9. The HVECU 9 stores the vehicle positional information to a storage such as a RAM or the like. As described above, the HVECU 9 obtains the vehicle positional information and the traffic information transmitted from the navigation ECU 14. The HVECU 9 calculates the amount of the compressed air used in the brake device 80, the door operator 81, and the suspension device 82, or the like by the predetermined operation using the vehicle positional information and the traffic information. The HVECU 9 calculates a predicted value of the required air amount, which needs to be stored in the air tank 8 (corresponding to step 22).

For example, the HVECU 9 predicts the number of times and strength of an operation of the brake device 80 in a near future by a predetermined operation using the vehicle positional information and a traffic information about a route to be travelled. The HVECU 9 calculates the amount of the compressed air used with the brake device 80 based on the predicted value. For example, when many downward slopes are included in the traffic information about a route to be travelled, it is predicted that the amount of the compressed air used in an actuation of the brake device 80 is relatively large in the near future. That is, it is possible that the required air amount to be stored of the air tank 8 is calculated from the amount of the compressed air to be used and the amount of the air stored in the air tank 8 at present.

For example, the HVECU 9 predicts the number of times of an operation of the door operator 81 in a near future by a predetermined operation using the vehicle positional information and traffic information about a route to be travelled. The HVECU 9 calculates the amount of the compressed air used in the door operator 81 based on the predicted value. For example, when it is predicted that a passenger gets on and off, the amount of the compressed air used by the actuation of the door operator 81 may become relatively large in the near future. As described above, it is possible that a required air amount to be stored of the air tank 8 is calculated from the amount of the compressed air, which is predicted to be used, and the air amount stored in the air tank 8 at the present.

For example, the HVECU 9 predicts the number of times and strength of an operation of the suspension device 82 in a near future by a predetermined operation using the vehicle positional information and a traffic information about a route to be travelled. The HVECU 9 calculates the amount of the compressed air used with the suspension device 82 based on the predicted value. For example, when it is supposed that a passenger gets on and off the vehicle from now on, in order to lower a vehicle height by the side of a doorway the amount of the compressed air used by the actuation of the suspension device 82 may relatively increase in the near future. When the traffic information of the route to be travelled includes many bad roads, in the near future, the amount of the compressed air used by the actuation of the suspension device 82 may relatively increase in order to secure a comfortable ride. As described above, it is possible that a required air amount to be stored of the air tank 8 is calculated from the amount of the compressed air, which is predicted to be used, and the air amount stored in the air tank 8 at present.

At step 23, the HVECU 9 determines whether it is necessary to supply the air tank 8 with the compressed air in the near future. The required air amount to be stored, which is calculated at step 22, is compared with the air amount stored in the air tank 8 at present. When the amount of air required operating the brake device 80, the door operator 81, the suspension device 82, or the like in the near future is insufficient, the HVECU 9 determines YES at step 23.

When determining YES at step 23, since it is necessary to supply the compressed air to the air tank 8, a processing to store air pressure in the air tank 8 is performed at step 60. When the HVECU 9 determines NO at step 23, it is determined that a need of supplying the compressed air is low. The processing proceeds to step 40, and each subsequent processing is executed.

According to the third embodiment, the HVECU 9 predicts the required air amount, which is necessary to be stored in the air tank 8 by the operation using the vehicle positional information and the traffic information obtained from the navigation ECU 14. In addition, the HVECU 9 determines whether it is required to supply the air tank 8 with air based on the predicted value of the required air amount. When the HVECU 9 determines that a need of supplying is low (that is, it is unnecessary to supply the air tank 8 with air), the HVECU 9 restricts air supply to the air tank 8 (corresponding to step 22, step 23, step 40 and step 50).

According to this control, a consumption air amount in the near future is predicted by the navigation information. The HVECU 9 calculates the amount of the compressed air, which is required to be stored in the air tank 8, for the near future, and determines whether the compressor 7 should be operated at present. Therefore, according to the fuel cell vehicle 100A, by the above determination, the fuel cell vehicle 100A reduces the amount of the compressed air in the air tank 8 at present, so that it is possible to improve a capacity of the air tank 8 receiving and storing the surplus electric power outputted from the fuel cell.

Fourth Embodiment

Figure 7:
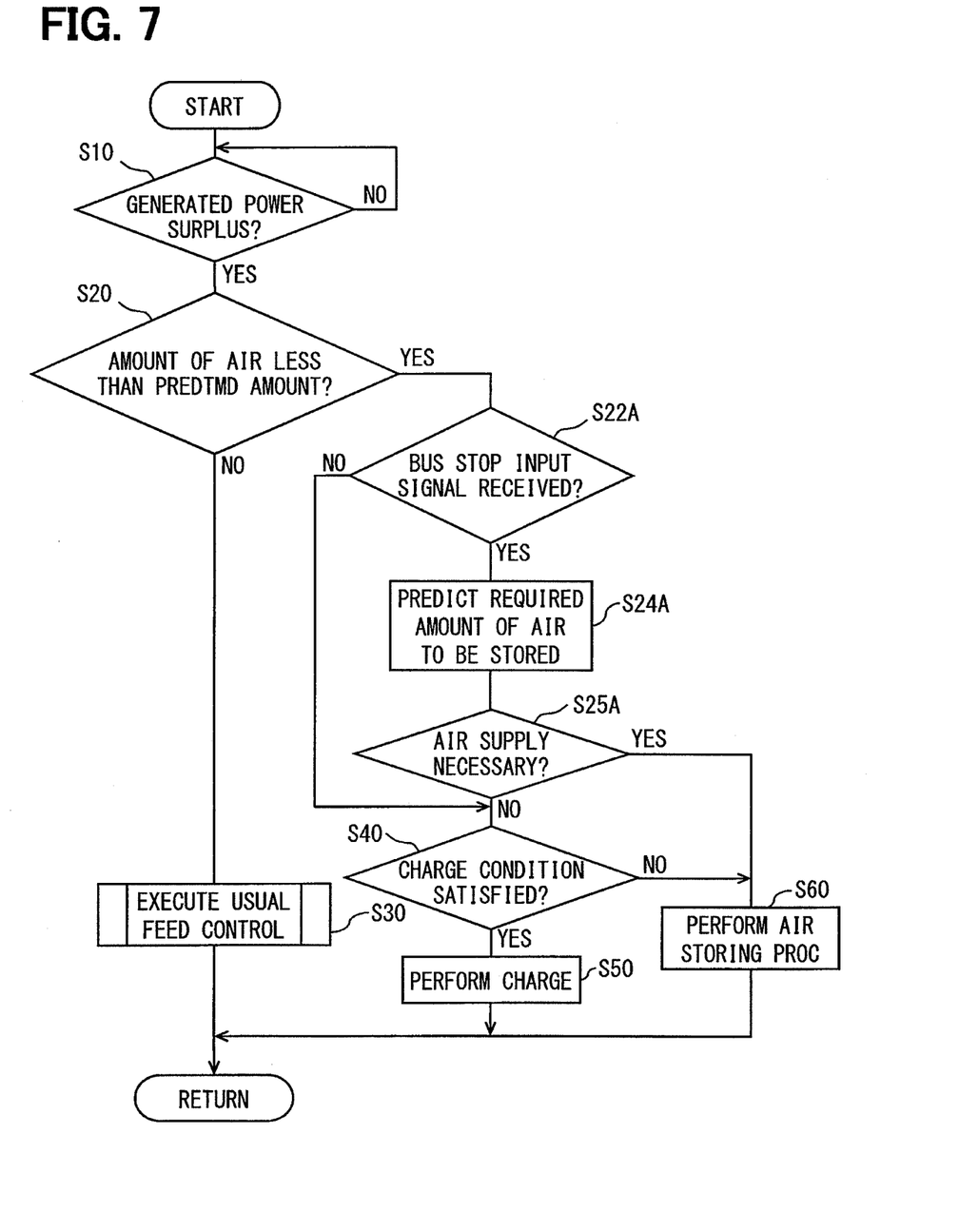
FIG. 7 is a flow chart illustrating the control of the energy conversion in the fourth embodiment.

A difference between a fuel cell vehicle 100A of the fourth embodiment and the fuel cell vehicle 100 of the above embodiments is that the vehicle is a bus stopping at a predetermined bus stop. According to the fuel cell vehicle 100A of the fourth embodiment, when the fuel cell vehicle 100A approaches a bus stop or when the fuel cell vehicle 100A receives a signal representing a stop of the bus or representing a getting off intention from the bus, an air supply to the air tank 8 is restricted. FIG. 5 illustrates a configuration of the fuel cell vehicle 100A of the fourth embodiment. A flow chart of FIG. 7 illustrates a control of an energy conversion in the fourth embodiment. A component attached the identical symbols as FIG. 1 in FIG. 5 is a similar configuration of the first embodiment, and the effect of the component is similar to the effect of the first embodiment. A step having the identical symbols as FIG. 3 in FIG. 7 performs the similar step as the first embodiment. Hereinafter, in the fourth embodiment, a configuration, processing, an operation, and an effect different from the first embodiment will be explained.

As described in FIG. 7, when it is determined that the compressed air in the air tank 8 is less than a predetermined air amount at step 20, the HVECU 9 determines whether an input signal is obtained at step 22A. The input signal represents that the bus stop is near, and may have various kinds of signals.

Incidentally, a state where the bus stop is near may represent a state where the bus stop exists in a predetermined range from a position of the bus or the bus will arrive at the bus stop in a specified period.

A first example of the input signal is as follows. By analyzing a bus stop positional information, which is obtained from road traffic information, when it is determined that the bus stop is in a predetermined range or the bus will arrive at the bus stop in a specified period, the HVECU 9 determines that the HVECU 9 has obtained the input signal representing a bus stop being near. The road traffic information may be information provided by a specific organization, or may be information held by an organization managing or holding the bus. The HVECU 9 or the navigation ECU 14 configures an information obtain portion for obtaining the bus stop positional information from the road traffic information. The HVECU 9 or the navigation ECU 14 analyzes the bus stop positional information. The road traffic information may be replaced by the vehicle positional information and the traffic information, which are transmitted to the HVECU 9 from the navigation ECU 14. That is, the HVECU 9 may obtain the bus stop positional information from the vehicle positional information and the traffic information.

The second example of the input signal is as follows. A switch 15 is an example of a getting off intention button. When a passenger who wants to get off the bus operates the switch 15, the HVECU 9 determines that the input signal representing the bus stop being near has been received. The getting off intention button corresponds to the switch 15, which will be operated when a bus stop, which a passenger wants to get off is approached. When the switch 15 is operated, the HVECU 9 receives the signal and determines YES at step 22A.

The third example of the input signal is as follows. When a driver of the bus operates the switch 15, which is an example of the bus stop button, the HVECU 9 determines that the input signal representing a bus stop being near has been received. The bus stop button is the switch 15 that a driver operates when the bus is stopped at the bus stop or the like. When the driver operates the switch 15, the HVECU 9 receives the signal, and determines YES at step 22A.

In addition, the HVECU 9 may determine YES at step 22A when the HVECU 9 receives at least one of the above first to third examples of the input signal. That is, when the HVECU 9 receives multiple input signals, the HVECU 9 determines YES at step 22A.

The HVECU 9 determines that the input signal representing that a bus stop is near at step 22A, and the processing proceeds to step 24A. At step 24A, the processing is similar to step 22 in the third embodiment. The HVECU 9 calculates a predicted value of the amount of the compressed air required to operate the brake device 80, the door operator 81, and the suspension device 82 or the like, which are serially operated in a stop of the bus.

The HVECU 9 determines at step 25A whether it is required to supply the air tank 8 with the compressed air. The required air amount to be stored, which is calculated at step 24A is compared with the air amount stored in the air tank 8 at present. When the amount of air required operating a series of operation at the time of a stop is insufficient, the HVECU 9 determines YES at step 25A.

When the processing is determined as YES at step 25A, it is necessary to supply the compressed air to the air tank 8. The air pressure storing processing will be executed at step 60.

When the processing is determined as NO at step 25A, the processing proceeds to step 40 and each subsequent processing is executed.

On the contrary, when the HVECU 9 determines that the input signal is not received at step 22A, the processing proceeds to step 40 and each subsequent processing is executed.

According to the fourth embodiment, when the HVECU 9 receives information representing that the bus stop is near, and determines that the air supply to the air tank 8 is not required, the secondary battery is charged using the generated power of the fuel cell. Therefore, in this case, the air supply to the air tank 8 using the generated power of the fuel cell is restricted (corresponding to step 22A, step 24A, step 25A, step 40, and step 50).

According to this control, the amount of the consumed air in the near future is predicted based on the information representing the bus stop being near. The HVECU 9 calculates the amount of the compressed air, which is required to be stored in the air tank 8, and determines whether the compressor 7 should be operated at present.

Therefore, according to the fuel cell vehicle 100A, the fuel cell vehicle 100A reduces the amount of the compressed air in the air tank 8 at present, and it is possible to improve a capacity of the air tank 8, which receives and stores the surplus electric power outputted from the fuel cell.

When the HVECU 9 receives at least one of the operation of the getting off intention button, the operation of the bus stop button, and obtained information of the information obtaining portion, the HVECU 9 determines that the HVECU 9 has obtained the information representing that the bus stop is near. According to this configuration, when at least one of information with respect to a bus stop, such as an operation by a passenger, an operation by a driver, a road information obtained from an external portion, is received, it is possible to surely improve a capacity to effectively consume the surplus power at the time of stop.

Another Embodiment

Although the embodiments of the present disclosure are explained above, it should be noted that the present disclosure is not limited to the present embodiments. The present disclosure may be changed and variously performed without departing from the scope of the present invention.

The configuration of the above embodiments is an example. A range of the present disclosure in not limited to a range of the description.

In the fourth embodiment, when the HVECU 9 determines that the input signal representing that the bus stop is near is received and the state of charge of the secondary battery 5 is less than a predetermined value, the processing proceeds to step 50. At step 50, the compressed air is not fed to the air tank 8. Alternatively, the amount of the compressed air to the air tank 8 may be reduced than usual, so that the air supply to the air tank 8 may be restricted.

Incidentally, in the present embodiment, the FC stack 1 corresponds to an example of a fuel cell in the present disclosure. The compressor 7 corresponds to an example of an air feeder. The HVECU 9, the FCECU 10, the battery ECU 11, and the air supply ECU 12 correspond to an example of a control unit. The brake device 80 corresponds to an example of an air brake, and an example of a predetermined device. The door operator 81 corresponds to an example of a predetermined device. The suspension device 82 corresponds to an example of an air type suspension, and an example of the predetermined device.

While the present disclosure has been described with reference to examples thereof, it is to be understood that the disclosure is not limited to the examples and constructions. The present disclosure is intended to cover various modifications and equivalent arrangements. In addition, while the various combinations and configurations, other combinations and configurations, including more, less or only a single element, are also within the spirit and scope of the present disclosure.

What is claimed is:

1. A fuel cell vehicle comprising:
   a fuel cell mounted to a vehicle, and at least having a pair of electrodes that pinch an electrolyte membrane, the pair of electrodes including a catalyst;
   a traveling motor driven by a generated power of the fuel cell to provide a driving force to a driving wheel of the vehicle;
   a secondary battery charged with the generated power of the fuel cell;
   a predetermined device that is driven by compressed air having an air pressure, and that has a predetermined function of the vehicle, the predetermined device being at least one of an air brake that brakes the vehicle, a door operator that opens and closes a vehicle door, and an air suspension device that lowers a doorway of the vehicle;
   an air tank storing the compressed air for driving the predetermined device;
   an electric air feeder supplying the compressed air to the air tank; and
   a control unit controlling (i) a charge of the secondary battery, (ii) an operation of the electric air feeder, (iii) a power generation of the fuel cell and (iv) a feeding destination of the generated power of the fuel cell, wherein
   the control unit
      operates the electric air feeder using the generated power of the fuel cell,
      converts the generated power of the fuel cell into the air pressure of the compressed air stored in the air tank when a state of charge of the secondary battery is equal to or more than a predetermined value, and
      supplies the compressed air to the air tank regardless of the state of charge of the second battery when the compressed air that drives the predetermined device has not been stored in the air tank.

2. The fuel cell vehicle according to claim 1, further comprising
   a navigation device obtaining at least a vehicle positional information and a traffic information, and performing an information communication with the control unit, wherein
   the predetermined device includes the air brake, which brakes the vehicle using the air pressure, and
   the control unit
      performs a calculation using the vehicle positional information and the traffic information transmitted from the navigation device,
      predicts a required amount of the compressed air to be stored in the air tank,
      determines whether an air supply to the air tank should be performed based on the predicted required amount of the compressed air, and
      restricts the air supply to the air tank when the control unit determines that the air supply is unnecessary.

3. The fuel cell vehicle according to claim 1, wherein
   the vehicle is a bus, which stops at a predetermined bus stop, and the control unit charges the secondary battery using the generated power of the fuel cell and restricts the air supply to the air tank when the control unit
(i) obtains information representing that the bus stop is near,
(ii) determines that the air supply to the air tank is unnecessary, and
(iii) determines that the state of charge of the secondary battery is less than a predetermined value.

4. The fuel cell vehicle according to claim 3, further comprising
at least one of a getting off intention button, a bus stop button, and an information obtaining portion, wherein
the getting off intention button is operated by a passenger of the bus,
the bus stop button is operated by a driver of the bus,
the information obtaining portion obtains a bus stop positional information from a traffic information, and
the control unit determines that the control unit has received information representing that the bus stop is near when the control unit receives at least one of an operation of the getting off intention button, another operation of the bus stop button, and obtained information of the information obtaining portion.

5. The fuel cell vehicle according to claim 4, wherein
a state that the bus stop is near represents a state that (i) the bus stop exists in a predetermined range from a position of the bus or (ii) the bus arrives at the bus stop in a specified period.

6. The fuel cell vehicle according to claim 1, wherein
when the generated power of the fuel cell is larger than an electric power demand of the vehicle to create an electric power surplus and a predetermined condition is satisfied, the control unit controls the secondary battery to charge with the electric power surplus of the fuel cell, and
when there is the electric power surplus and the secondary battery cannot be charged, the control unit operates the electric air feeder using the electric power surplus of the fuel cell, and supplies the compressed air to the air tank.

7. A method for managing a surplus output of a bus fuel-cell system, comprising:
determining whether a fuel cell located within a bus is generating surplus electric power;
determining whether an air pressure of compressed air stored in an air tank located within the bus is less than a predetermined amount;
when the air pressure is less than the predetermined amount, predicting a predicted amount of the air pressure required to operate at least one of an air brake that brakes the bus, a door operator that opens and closes a door of the bus, and an air suspension device that lowers a doorway of the bus;
determining whether the air pressure of the compressed air stored in the air tank is sufficient to satisfy the predicted amount; and
converting the surplus electric power of the fuel cell into air pressure to increase the air pressure of the compressed air stored in the air tank to the predicted amount.

8. The method for managing surplus output of a bus fuel-cell system in claim 7, further comprising
determining whether a bus stop input signal has been received, wherein
the predicting of the predicted amount occurs after the bus stop input signal has been received.

9. The method for managing surplus output of a bus fuel-cell system in claim 7, further comprising
obtaining navigation information, via a GPS device, that includes locations of a plurality of bus stops on a route, and
determining whether the bus is located near the plurality of bus stops on the route, wherein
the predicting of the predicted amount occurs after the bus is located near the plurality of bus stops on the route so that an amount of the compressed air required for the plurality of bus stops can be predicted.

* * * * *